United States Patent [19]

Centers, deceased

[11] 3,913,302

[45] Oct. 21, 1975

[54] PROTECTIVE BOOT FOR HORSES

[76] Inventor: Allen Dale Centers, deceased, late of 222 E. Foothill Blvd., Arcadia, Calif. 91006, by Alta A. Centers, administratrix

[22] Filed: Aug. 5, 1974

[21] Appl. No.: 494,416

[52] U.S. Cl. ................... 54/65; 54/82; 119/143; 128/77
[51] Int. Cl.² .......................................... B68B 3/08
[58] Field of Search .............. 54/82, 65; 119/1, 143, 119/145; 128/77

[56] References Cited
UNITED STATES PATENTS

| 901,592 | 10/1908 | Clegg | 54/82 |
| 1,395,689 | 11/1921 | McKenzie | 54/82 |
| 2,287,821 | 6/1942 | O'Donovan | 128/77 |
| 2,937,487 | 5/1960 | Dever | 54/82 |

Primary Examiner—Robert Peshock
Assistant Examiner—J. Q. Lever
Attorney, Agent, or Firm—Poms, Smith, Lande & Glenny

[57] ABSTRACT

A boot for protectively encircling the leg of an animal such as a horse, including a lower casing surrounding the cannon, an articulated hinge attached to the upper edge of the lower casing for surrounding the animal's leg joint at the upper end of the cannon bone, and an upper casing attached to the upper edge of the hinge and extending upwardly therefrom for surrounding the animal's leg extending upwardly from the leg joint, each casing desirably including an outer sleeve an an inner lining of resilient material and means for selectively adjusting the circumferential length of the respective casing. The hinge includes inner and outer flexible sheets, desirably of soft leather, with compressible material sandwiched between the sheets, the sheets being attached to one another along a plurality of spaced lines of stitching extending circumferentially of the hinge and forming between adjacent lines of stitching a plurality of circumferentially extending hinge sections. The lower edge of the lower casing may have attached thereto a shield projecting downwardly for protecting the front face of the pastern.

1 Claim, 6 Drawing Figures

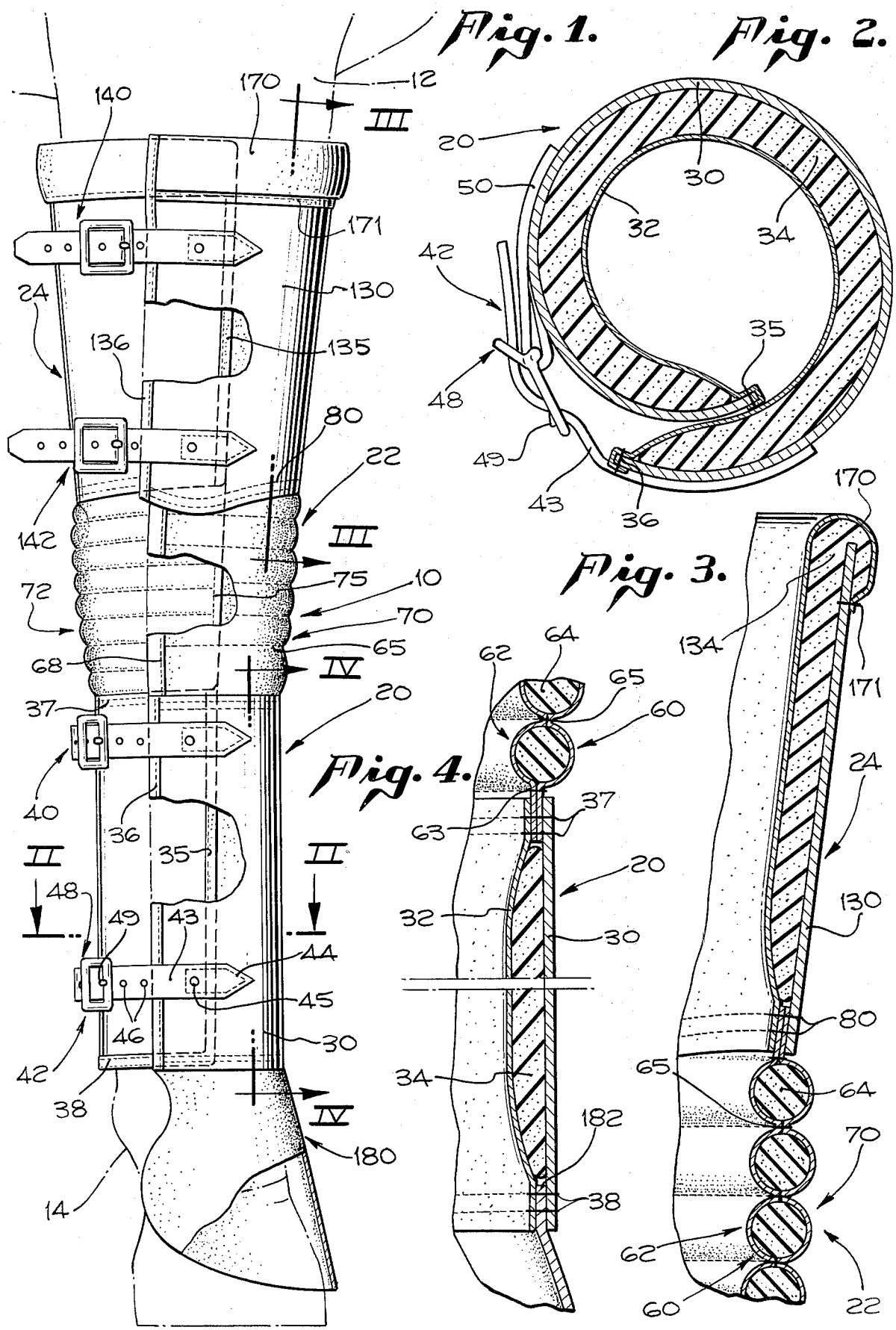

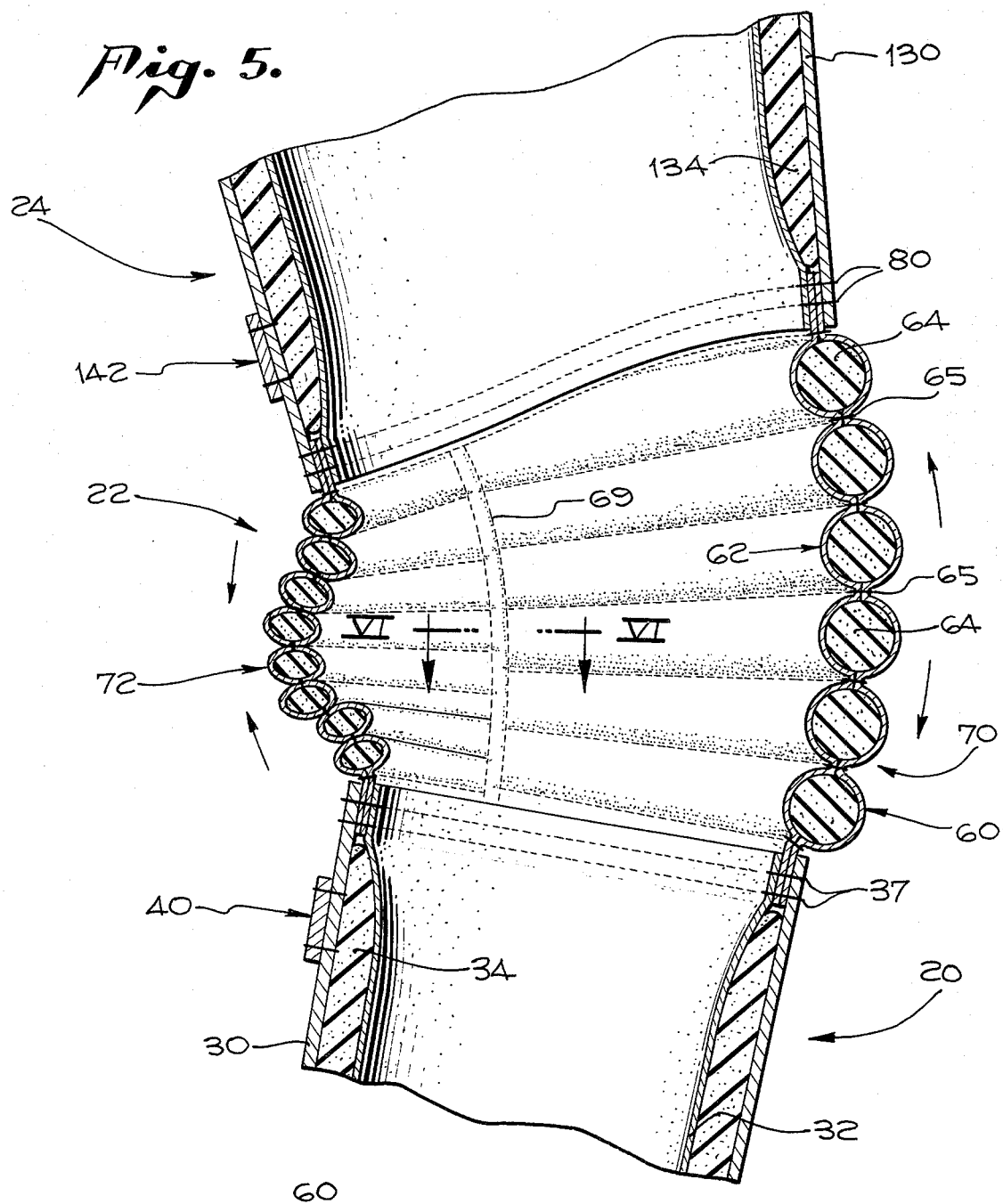

PROTECTIVE BOOT FOR HORSES

BACKGROUND AND FIELD OF THE INVENTION

The present invention is directed generally to animal protective gear, and more particularly to a boot for encircling and protecting the leg of an animal, particularly a horse, and the preferred embodiment of the invention will be herein described and illustrated in connection with its application to the front leg of a horse.

The body of a horse, and particularly its legs, are peculiarly subject to being damaged, sometimes quite seriously, and not infrequently by self-inflicted injuries. This latter situation arises, for example, when a horse regains consciousness after being anesthetized for surgical or other procedures. It is not uncommon that the frightened animal under these conditions will flail about and injure itself in so doing.

Another situation giving rise to the possibility of injury to the leg of a horse occurs when the horse is being transported, as in a trailer towed on the highway by an automobile or truck. The jolting and pitching to which such a trailor is subjected in ordinary highway travel is frequently sufficient to cause the horse, in an effort to maintain its balance, to inadvertently injure one or another of its legs.

The present invention is intended to minimize and virtually eliminate the possibility of injuries of the kind just discussed, and has for its principal object the provision of novel boot means for surrounding a major portion of the animal's leg, including hinge means for permitting the animal at least minimal movement of the leg joint. Additional objects of the invention are to provide, in such boot means, a lower casing for surrounding the cannon, articulated hinge means immediately above the lower casing and attached thereto for surrounding the animal's leg joint, and an upper casing attached to the upper edge of the hinge means and extending upwardly therefrom; for providing in such casings means for selectively adjusting the circumferential length of the casings; for providing resilient or compressible material in the casings to protect the animal's leg from impact on the casing of an external object; and for other and additional purposes as will become clear from a reading of the following description of a preferred embodiment of the invention, taken in connection with the accompanying drawings.

BRIEF DESCRIPTION OF THE DRAWINGS

FIG. 1 is a side elevational view of a protective boot in accordance with the present invention, shown attached to the front leg of a horse, the leg being shown in dotted outline.

FIG. 2 is a sectional view looking downwardly on arrows II—II of FIG. 1.

FIG. 3 is a fragmentary sectional view taken on the arrows III—III of FIG. 1.

FIG. 4 is a fragmentary view taken on the arrows IV—IV of FIG. 1.

FIG. 5 is a fragmentary vertical sectional view on an enlarged scale of the central portion of the boot, including the hinge means, with the parts shown in the position corresponding to partial articulation of the animal's leg joint.

FIG. 6 is a fragmentary sectional view taken on the arrows VI—VI of FIG. 5.

DETAILED DESCRIPTION

Referring in detail to FIG. 1, there is indicated generally at 10 a protective boot of the present invention, attached in operative relation to the foreleg of a horse, the leg being shown in dotted outline, and the upper portion thereof being indicated at 12 and the lower portion at 14.

Boot 10 includes three major portions, a lower casing indicated generally at 20 surrounding the cannon, articulated hinge means indicated generally at 22 attached to the upper edge of lower casing 20 and surrounding the knee joint, and an upper casing indicated generally at 24, attached to the upper edge of hinge means 22 and extending upwardly therefrom and surrounding the portion of the leg above the knee.

As best seen in FIG. 2, lower casing 20 includes an outer sleeve 30 and an inner lining 32, having sandwiched therebetween a quantity of compressible material 34, such as sponge rubber or the like. Sleeve 30 and lining 32 are attached together along their vertical edges by stitching 35 along the inner vertical edges, as seen in FIG. 2, and by stitching 36 along their outer vertical edges. Sleeve 30 and lining 32 are also attached together along their upper and lower edges by stitching 37 and 38 respectively (see FIG. 4). Thus, the compressible material 34 is retained in its position seen in FIGS. 2 and 4. Outer sleeve 30 and inner lining 32 are of material having at least some flexibility, preferably leather, and outer sleeve 30 is desirably thicker, stronger and somewhat stiffer than inner lining 32. The circumferential lengths of sleeve 30 and lining 32 are desirably such as to provide a certain amount of overlap, as seen in the lower portion of FIG. 2.

Means are provided in accordance with the invention for selectively adjusting the effective circumferential length of the lower casing, so that the inner face of the inner lining 32 can be maintained in fairly close contact with the skin of the cannon portion of the leg. In the present form of the invention, such means include upper and lower strap assemblies indicated generally at 40 and 42 respectively. Strap assembly 42 includes a strap 43 whose right end portion as seen in FIG. 1 is attached to casing sleeve 30 as by stitching 44 and reinforcing rivet 45, the free end of strap 43 being provided with a series of spaced perforations 46. The strap assembly 42 also includes a buckle indicated generally at 48 of conventional construction, including a tongue 49 which is engageable with a selected one of the perforations 46 in known manner. Buckle 48 in turn is attached to sleeve 30 by strap means 50, the end portion of strap 50 being stitched and riveted to sleeve 30 in the same manner as the end portion of strap 43. The upper strap assembly 40 is identical to lower strap assembly 42 in construction and operation.

Hinge means 22 desirably include outer and inner sheets of tough flexible material such as soft leather, sandwiching therebetween a quantity of compressible material such as sponge rubber. Furthermore, the outer and inner sheets are attached to one another as by stitching along generally horizontally disposed arcuate lines of attachment, in order to form a plurality of circumferentially extending sections, each containing a predetermined amount of the compressible material in a sort of compartment separate from adjacent compartments so formed. Furthermore, the hinge means may advantageously be divided into a front portion and a rear portion, with a greater number of circumferentially extending sections formed in the rear portion than in the front portion. This may be accomplished by a vertical line of stitching between the two sheets, serving as the dividing line between the front portion and the rear portion, and giving rise to better flexing of the hinge means during angular articulation of the animal's leg joint itself.

More specifically, and with reference primarily to FIGS. 4 and 5, the outer sheet of hinge means 22 is indicated generally at 60, and the inner sheet thereof is indicated generally at 62. The lower portions of the two sheets are stitched together at 63, and continue downwardly to be stitched securely between outer sleeve 30 and inner lining 32 of the lower casing 20. Immediately above stitching 63, sheets 60 and 62 diverge from one another in order to receive therebetween a quantity of compressible material 64. Immediately thereabove the sheets are again stitched together along line of stitching 65, so that the compressible material 64 and its portions of sheets 60 and 62 form effectively a partially circumferentially extending section of the hinge means. The arcuate extent of the sections so formed is determined at one end by lines of stitching 68 (see FIG. 1) and at the other end by lines of stitching 69 (see FIG. 5), each of the latter lines of stitching extending vertically the entire width of the hinge sheets 60 and 62, and thereby forming a front portion indicated generally at 70 of the hinge means.

As clearly seen in FIGS. 1 and 5, the front portion 70 of the hinge means is there shown as including a total of six sections similar to the section including compressible material 64 previously described. The rear portion of hinge means 22, indicated generally at 72, is formed generally similarly to front portion 70, except that, in the present illustrative form of the invention, there are a total of eight circumferentially extending sections, each bounded arcuately by the line of stitching 69 at one end and, at the other end, by a similar line of stitching 75 (see FIG. 1). It has been found, as indicated in FIG. 5, that the greater number of circumferential or arcuate sections in the rear portion 72 of the hinge means than in the front portion 70 permits more effective flexing or articulation of the hinge means, to accommodate normal movement of the knee joint of the animal.

Upper casing 24 is attached to the upper edges of hinge means 22 by suitable means such as lines of stitching 80, and extends upwardly therefrom. Upper casing 24 is similar in major respects to lower casing 20, except that the upper casing is desirably divergent upwardly in order to better accommodate and fit the typical contour of the animal's leg. More particularly, and using reference characters one hundred greater than the corresponding components of lower casing 20, upper casing 24 includes an outer sleeve 130 and an inner lining 132, sandwiching therebetween a quantity of compressible material 134 such as sponge rubber or the like. The lower edges of sleeve 130 and lining 132 are stitched together and to the upper edges of hinge sheets 60 and 62 along the line of stitching 80 previously mentioned. In the upper part of casing 24, in order to prevent injury to the animal such as by abrasion on adjacent body parts of the animal, the inner lining 132, as best shown in FIG. 3, extends above the upper end of sleeve 130, and includes a portion 170 which extends downwardly and outwardly of the upper edge of the outer sleeve and is attached to the sleeve along a line of stitching 171. It will be noted that compressible material 134 is distributed around the upper edge of sleeve 130, so that that upper edge cannot directly contact the body of the animal.

Additionally, upper casing 24, like lower casing 20, is provided with means for selectively adjusting the effective circumferential length of the upper casing. In the present form of the invention, such means include upper and lower strap assemblies indicated generally at 140 and 142 respectively, corresponding in construction and operation to strap assemblies 40 and 42 heretofore described in connection with lower casing 20. The vertically extending edges of sleeve 130 and lining 132 are attached along vertically extending lines of stitching 135 and 136, in a manner similar to that of the corresponding lines of stitching 35 and 36 of the lower casing.

Because the lower casing does not completely protect the pastern of the animal, shield means may be provided for accomplishing this purpose. In the present form of the invention, such shield means are seen in FIGS. 1 and 4 and are indicated generally at 180. This shield may be made of leather, and its upper edge 182 is attached to the corresponding portion of the lower edge of casing 20 along lines of stitching 38 previously mentioned. Desirably shield 180 may extend approximately halfway or a little more around the circumference of the pastern, and may extend downwardly to protect the front portion of the coronet and the upper portion of the hoof proper, all as indicated in the lower portion of FIG. 1.

What is claimed is:

1. A boot adapted to encircle the leg of a horse for protecting the cannon, the leg joint immediately above the cannon, and the portion of the leg immediately above said leg joint, comprising:

a lower casing for surrounding the cannon, including an outer sleeve and an inner lining of resilient material, an articulated hinge attached to the upper edge of the lower casing for surrounding the leg joint at the upper end of the cannon, and an upper casing attached to the upper edge of said hinge and extending thereabove for surrounding the portion of the leg extending upwardly from said joint, including an outer sleeve having an inner lining of resilient material, said hinge including outer and inner generally rectangular flexible sheets attached to one another along their edge portions and having compressible material sandwiched therebetween, and wherein the hinge sheets are attached to one another additionally along a plurality of spaced parallel lines of attachment extending partially circumferentially of the hinge and forming a plurality of arcuately extending sections, and the hinge sheets are attached to one another additionally along a line of attachment transverse to the circumferential lines of attachment and disposed generally midway between end edges of the sheets, dividing said hinge into a front portion and a rear portion.

* * * * *